United States Patent
Kii et al.

(10) Patent No.: US 9,085,237 B2
(45) Date of Patent: Jul. 21, 2015

(54) SPEED LIMITER

(75) Inventors: Yuji Kii, Tokyo (JP); Tasuku Maruyama, Tokyo (JP); Munenori Matsuura, Tokyo (JP)

(73) Assignee: FUJI JUKOGYO KABUSHIKI KAISHA, Tokyo (JP)

(*) Notice: Subject to any disclaimer, the term of this patent is extended or adjusted under 35 U.S.C. 154(b) by 943 days.

(21) Appl. No.: 13/200,823

(22) Filed: Oct. 3, 2011

(65) Prior Publication Data

US 2013/0085655 A1 Apr. 4, 2013

(51) Int. Cl.
| B60K 31/00 | (2006.01) |
| B60K 31/18 | (2006.01) |
| F02D 41/02 | (2006.01) |
| F02D 11/10 | (2006.01) |
| B60K 31/04 | (2006.01) |
| B60K 31/02 | (2006.01) |

(52) U.S. Cl.
CPC .............. *B60K 31/18* (2013.01); *F02D 11/105* (2013.01); *F02D 41/0205* (2013.01); *B60K 31/00* (2013.01); *B60K 31/02* (2013.01); *B60K 31/042* (2013.01); *B60K 31/185* (2013.01); *B60K 2031/0091* (2013.01); *B60K 2310/244* (2013.01); *B60W 2510/0638* (2013.01); *B60W 2540/10* (2013.01); *B60W 2550/22* (2013.01); *B60W 2710/0605* (2013.01); *B60Y 2400/3015* (2013.01); *F02D 2200/501* (2013.01); *F02N 2300/306* (2013.01)

(58) Field of Classification Search
CPC ........... B60K 31/00; B60K 2031/0091; B60K 31/02; B60K 31/042; B60K 31/118; B60K 31/185

USPC ................ 701/70, 93, 94, 96, 102, 110, 115; 123/349, 350, 351, 361, 399
See application file for complete search history.

(56) References Cited

U.S. PATENT DOCUMENTS

| 3,952,829 | A | * | 4/1976 | Gray .............................. 180/170 |
| 4,419,729 | A | * | 12/1983 | Krieder ........................... 701/93 |
| 4,597,049 | A | * | 6/1986 | Murakami ..................... 701/110 |
| 4,860,210 | A | * | 8/1989 | McCombie ..................... 701/93 |
| 4,901,695 | A | * | 2/1990 | Kabasin et al. ................ 123/399 |
| 5,235,512 | A | * | 8/1993 | Winkelman et al. ............ 701/93 |
| 5,315,295 | A | * | 5/1994 | Fujii ............................. 340/936 |
| 5,329,455 | A | * | 7/1994 | Oo et al. ......................... 701/93 |
| 5,345,907 | A | * | 9/1994 | Matsuoka ..................... 123/399 |
| 5,452,697 | A | * | 9/1995 | Sasaki et al. .................. 123/399 |
| 5,521,825 | A | * | 5/1996 | Unuvar et al. .................. 701/36 |
| 5,646,850 | A | * | 7/1997 | Ishida et al. .................... 701/93 |
| 5,746,178 | A | * | 5/1998 | Susaki et al. ................. 123/399 |

(Continued)

FOREIGN PATENT DOCUMENTS

| JP | 2007-199026 (A) | | 8/2007 |
| WO | WO 9727388 | * | 7/1997 |

*Primary Examiner* — Thomas Moulis
(74) *Attorney, Agent, or Firm* — McGinn IP Law Group, PLLC

(57) ABSTRACT

Provided is a speed limiter, wherein a vehicle speed is detected, and a speed limit displayed on a speed sign is detected based on an image captured by a front monitoring camera. A speed difference between the vehicle speed and the speed limit is calculated, and an accelerator sensitivity gain is set using the speed difference as a parameter. Then an accelerator opening degree is corrected with the accelerator sensitivity gain to obtain a pseudo accelerator opening degree. A target throttle opening degree is set based on the pseudo accelerator opening degree and an engine rpm.

15 Claims, 4 Drawing Sheets

(56) References Cited

U.S. PATENT DOCUMENTS

| | | | |
|---|---|---|---|
| 6,052,644 A * | 4/2000 | Murakami et al. | 701/93 |
| 6,134,499 A * | 10/2000 | Goode et al. | 701/93 |
| 6,166,658 A * | 12/2000 | Testa | 701/93 |
| 6,237,564 B1 * | 5/2001 | Lippa et al. | 123/361 |
| 6,278,931 B1 * | 8/2001 | Crawford et al. | 701/93 |
| 6,491,023 B1 * | 12/2002 | Lippa | 123/399 |
| 6,647,328 B2 * | 11/2003 | Walker | 701/36 |
| 6,741,923 B2 * | 5/2004 | Katakura et al. | 701/101 |
| 6,766,785 B2 * | 7/2004 | Ishida et al. | 123/399 |
| 6,898,507 B2 * | 5/2005 | Aoyama et al. | 701/93 |
| 7,233,854 B2 * | 6/2007 | Rayl et al. | 701/93 |
| 7,325,533 B2 * | 2/2008 | Matsuda | 123/399 |
| 7,433,772 B2 * | 10/2008 | Isaji et al. | 701/71 |
| 8,041,493 B2 * | 10/2011 | Seto et al. | 701/93 |
| 8,078,380 B2 * | 12/2011 | Sagisaka | 701/93 |
| 8,296,034 B2 * | 10/2012 | Tetsuka et al. | 701/93 |
| 8,316,822 B2 * | 11/2012 | Gray | 123/350 |
| 8,731,770 B2 * | 5/2014 | Fischer | 701/33.4 |
| 2004/0015275 A1 * | 1/2004 | Herzog et al. | 701/19 |
| 2005/0004736 A1 * | 1/2005 | Belcher et al. | 701/50 |
| 2005/0128063 A1 * | 6/2005 | Isaji et al. | 340/439 |
| 2009/0037070 A1 * | 2/2009 | Nakamura | 701/96 |
| 2010/0161195 A1 * | 6/2010 | Shin | 701/93 |
| 2010/0198450 A1 * | 8/2010 | Shin | 701/29 |
| 2011/0190972 A1 * | 8/2011 | Timmons et al. | 701/29 |
| 2011/0279337 A1 * | 11/2011 | Corwin et al. | 343/713 |
| 2011/0307155 A1 * | 12/2011 | Simard | 701/93 |
| 2013/0110367 A1 * | 5/2013 | To et al. | 701/70 |
| 2014/0005907 A1 * | 1/2014 | Bajpai | 701/96 |

* cited by examiner

SPEED LIMITER

BACKGROUND OF THE INVENTION

1. Field of the Invention

The present invention relates to a speed limiter that recognizes a speed limit for a road on which a subject vehicle is traveling, based on an image captured by a front monitoring camera, and changes characteristics of throttle opening with respect to accelerator opening when a difference between the speed of the vehicle and the speed limit exceeds a predetermined value.

2. Description of the Related Art

A driver generally recognizes a speed limit displayed on a road sign or a road-surface sign on a road to determine whether or not the speed of a subject vehicle is within the speed limit. When the vehicle speed exceeds the speed limit, the driver controls the vehicle speed by performing a decelerating operation such as a reduction in a pressing amount of the accelerator pedal so as to make the vehicle speed fall within the speed limit.

However, it is difficult to operate the vehicle while constantly recognizing the vehicle speed of the traveling road. It frequently occurs that the driver drives at a normal legal speed, missing a road sign or misunderstanding that a speed limit is not set for the traveling road.

As means for preventing an overspeed due to the carelessness of the driver described above, there is known a technology that detects the position of a subject vehicle using a car navigation system, reads speed limit data stored in map data, and gives an alarm when the speed of the subject vehicle exceeds the speed limit.

However, the speed limit is periodically changed, and sometimes a new road is open. Although it is possible to accommodate these cases by updated the map data, the update of the map data at short intervals requires a significant cost, and thus is not realistic.

An alternative technology is to recognize the speed limit based on information from a beacon using a light or radio wave that is installed on a side of a road. However, when the vehicle is traveling in a region where a beacon cannot be received, accurate speed limit information cannot be obtained.

In light of this, for example, Japanese Unexamined Patent Application Publication No. 2007-199026 discloses a technology that recognizes a speed limit displayed on a speed sign based on an image captured by a front monitoring camera, displays both an actual vehicle speed and the speed limit on an instrument panel, and, when the actual vehicle speed exceeds the speed limit, gives a warning by coloring a speed excess region.

According to the technology disclosed in Japanese Unexamined Patent Application Publication No. 2007-199026, since the speed limit is recognized based on the image captured by the front monitoring camera, the driver can be always informed of the latest seed limit.

There is also known a device that, when an overspeed is detected, makes a warning as well as activates a speed limiter to encourage the driver to drive within a speed limit.

The device may activate the limiter and limit the speed without exception whenever the actual vehicle speed exceeds the speed limit. In this case, if, for example, vehicles are traveling with a short inter-vehicle distance on a crowded road and only the speed of the subject vehicle is limited, following vehicles are prevented from running smoothly, and moreover, the subject vehicle may cause congestion.

SUMMARY OF THE INVENTION

The present invention is made in view of the above, and it is an object of the present invention to provide a speed limiter that can recognize a speed limit of a road on which a subject vehicle is traveling even if the subject vehicle is not equipped with a navigation system, compare the speed of the subject vehicle and the speed limit, and, when the speed of the subject vehicle exceeds the speed limit, encourage the driver to drive within the speed limit without compellingly regulating the speed of the subject vehicle.

In order to accomplish the aforementioned object, the speed limiter of the present invention includes: a capturer for capturing a front of a subject vehicle; a vehicle speed detector for detecting a speed of the subject vehicle; an accelerator opening detector for detecting an accelerator opening degree; an engine rpm detector for detecting an engine rpm; a speed limit detector for detecting a speed limit displayed on a speed sign, based on an image captured by the capturer; an accelerator sensitivity gain setter for setting an accelerator sensitivity gain corresponding to a speed excess if an overspeed is detected based on a speed difference between a vehicle speed detected by the vehicle speed detector and a speed limit detected by the speed limit detector; a pseudo accelerator opening setter for setting a pseudo accelerator opening degree by correcting an accelerator opening degree detected by the accelerator opening detector with an accelerator sensitivity gain set by the accelerator sensitivity gain setter; and a target throttle opening setter for setting a target throttle opening degree based on an pseudo accelerator opening set by the pseudo accelerator opening setter and an engine rpm detected by the engine rpm detector.

According to the present invention, a speed sign is recognized with an image captured by the capturer to detect a speed limit displayed on the speed sign. As a result, even a vehicle that is not equipped with a car navigation system can recognize a speed limit of the road on which the vehicle is traveling, and thus high versatility is achieved.

Furthermore, if it is determined, based on the difference between the subject vehicle speed and the detected speed limit, that the subject vehicle speed exceeds the speed limit, the accelerator opening degree is spuriously limited corresponding to the speed excess, and the throttle valve opening degree is corrected based on the limited accelerator opening degree. As a result, compared to forceful control of the subject vehicle speed, the present invention can encourage the driver to drive within the speed limit, without discomfort.

DESCRIPTION OF THE PREFERRED EMBODIMENTS

Figure 1:
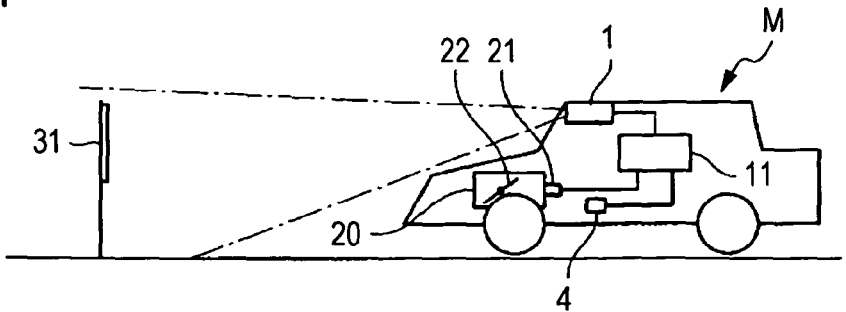
FIG. 1 is a schematic configuration view of a vehicle equipped with a speed limiter.

An embodiment of the present invention will hereunder be described with reference to the drawings. As shown in FIG. 1, a subject vehicle M, which is an automobile or the like, includes: a front monitoring camera 1 as a capturer that captures a front of the subject vehicle M; a throttle opening control unit 11 that identifies a speed sign 31 and the like from an image captured by the front monitoring camera 1 and recognizes a speed limit displayed thereon to set a throttle opening degree with respect to an accelerator opening degree according to a relationship between the speed limit and a vehicle speed of the subject vehicle M; and a throttle actuator 21 that is provided to an engine 20 and operates according to a control signal from the throttle opening control unit 11. The throttle actuator 21 adjusts an opening degree of a throttle valve 22.

Figure 2:
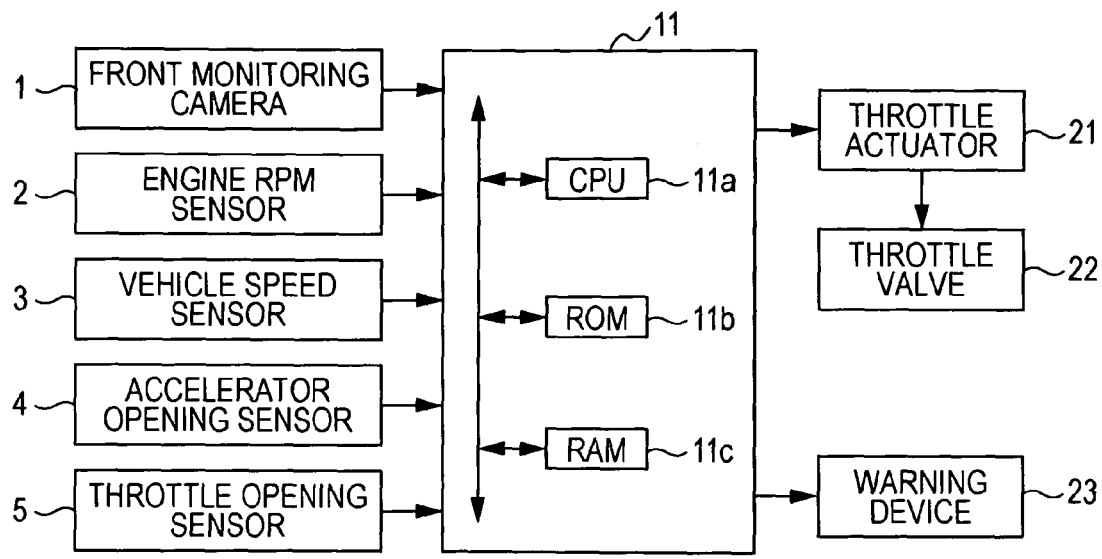
FIG. 2 is a block diagram showing the configuration of the speed limiter.
Figure 3:
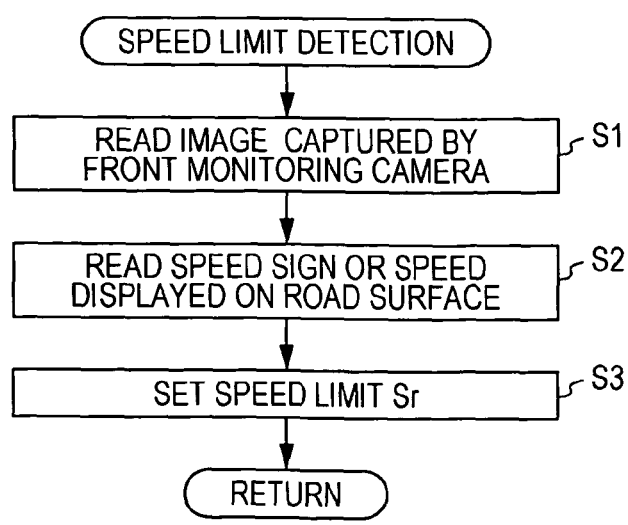
FIG. 3 is a flowchart showing a speed limit detection routine.

As shown in FIG. 2, the throttle opening control unit 11 mainly includes a microcomputer having a CPU 11a, a ROM 1b, a RAM 11c and the like. An input side of the throttle opening control unit 11 is connected to the front monitoring camera 1, an engine rpm sensor 2 serving as an engine rpm detector, a vehicle speed sensor 3 serving as a vehicle speed detector, an accelerator opening sensor 4 serving as an accelerator opening detector, a throttle opening sensor 5 and the like. An output side of the throttle opening control unit 11 is connected to the throttle actuator 21 which opens and closes the throttle valve 22, a warning device 23 serving as an alarm, and the like. Examples of the output form of the warning device 23 includes lighting or blinking of a warning lamp installed on an instrument panel, sounding of a buzzer, and output of an voice notifying an overspeed from a speaker.

The CPU 11a reads an image captured by the front monitoring camera 1 and parameters detected by the sensors 2 to 5, according to a control program stored in the ROM 11b, to execute throttle opening control for controlling an opening degree of the throttle valve 22. In addition to the control program, the ROM 11b stores fix data such as template data for recognizing the speed sign 31 and a road-surface speed sign 32 (see FIG. 5) as well as for recognizing a speed displayed on the signs 31 and 32, and a target torque map for setting a target torque.

The template data stored in the ROM 11b include template data regarding a speed sign and road-surface speed sign, and template data regarding a speed limit displayed thereon. The speed sign 31 displaying a speed limit is formed in a circular plate shape, while a speed limit displayed the road-surface speed sign 32 is substantially hexagon shaped. The speed limits can be recognized by applying pattern matching to these and image data. The template data regarding the speed limit stores data corresponding numerals (for example, 50, 40 and 30) indicating a predetermined speed limit for each of the speed sign 31 and road-surface speed sign 32. The RAM 11c temporarily stores data during calculation.

The throttle opening control sets a throttle opening degree that is basically proportional to a pressing amount of an accelerator pedal operated by a driver. If a vehicle speed of the subject vehicle M exceeds a speed limit, an accelerator sensitivity gain is set according to a difference therebetween, and the pressing amount of the accelerator pedal is corrected with the accelerator sensitivity gain to set a pseudo accelerator opening degree. Then, a throttle opening degree is set based on the pseudo accelerator opening degree.

A throttle opening process executed by the throttle opening control unit 11 is specifically executed according to flowcharts shown in FIGS. 2 to 5. Firstly, a speed limit detection routine shown in FIG. 3 will be explained. The procedure in this routine corresponds to the speed limit detector of the present invention.

According to this routine, image data of a front of the subject vehicle M captured by the front monitoring camera 1 are read in step 1, and pattern matching is performed with the read image data and the template data stored in the ROM 11b in step 2 to recognize the speed sign 31 and the road-surface speed sign 32 (see FIG. 5) of the road on which the subject vehicle M is traveling, as well as to recognize a speed limit displayed on the speed signs 31 and 32. Then a speed limit Sr is set in step 3 based on the recognized displayed speed, and the routine is exited.

Figure 4:
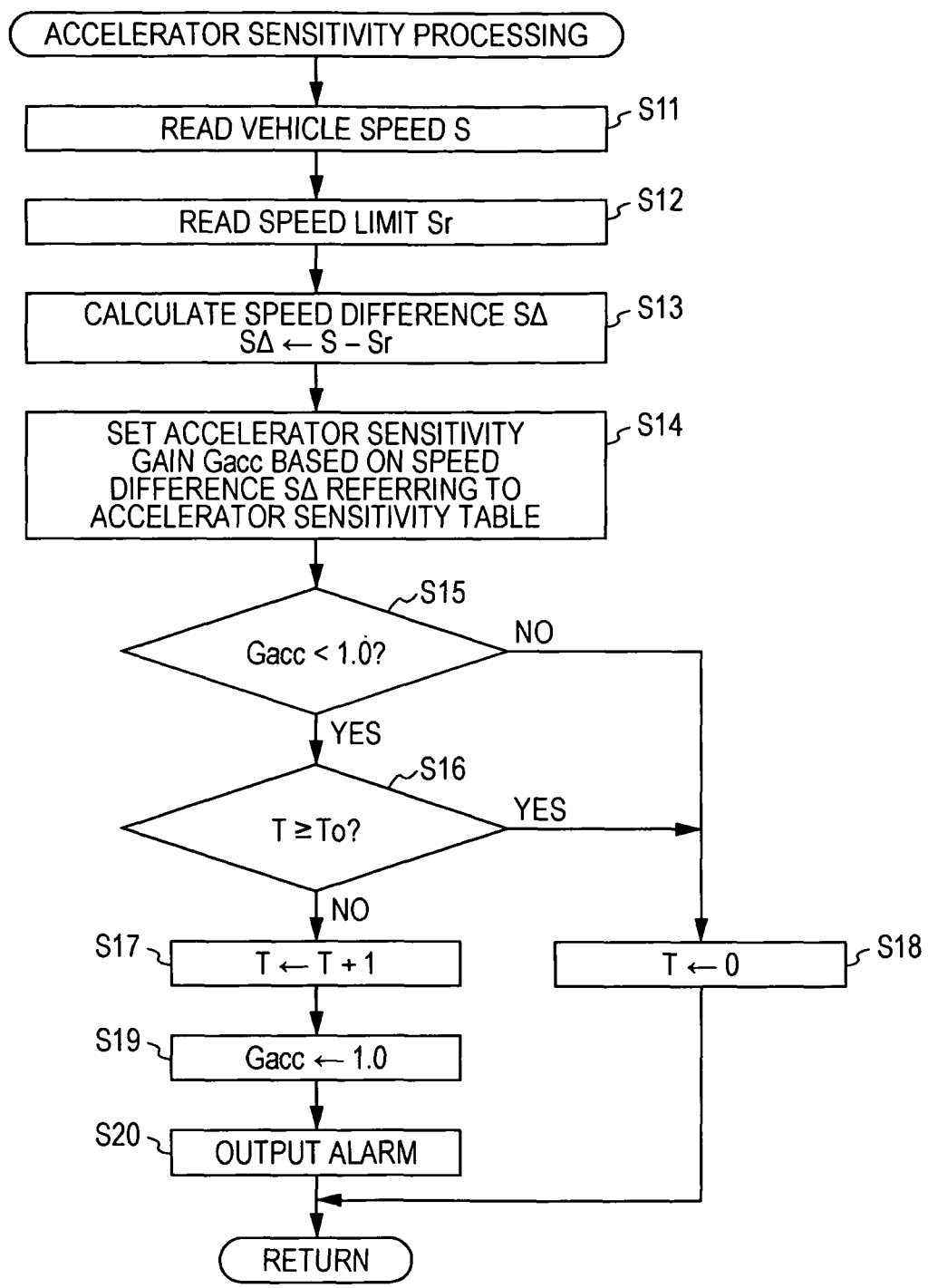
FIG. 4 is a flowchart showing an accelerator sensitivity processing routine.

The speed limit Sr is read in an accelerator sensitivity processing routine shown in FIG. 4. This procedure in FIG. 4 corresponds to the accelerator sensitivity gain setter of the present invention.

According to this routine, firstly, a vehicle speed S detected by the vehicle speed sensor 3 is read in step S11, and the speed limit Sr is read in step S12. Then in step S13 a speed difference S$\Delta$ is calculated from a difference between the vehicle speed S and the speed limit Sr (S$\Delta \leftarrow$S−Sr). Then the routine proceeds to step S14, wherein an accelerator sensitivity gain Gacc is set using the speed difference S$\Delta$ as a parameter and referring to an accelerator sensitivity table shown in FIG. 7. Then, the routine proceeds to step S15.

Figure 7:
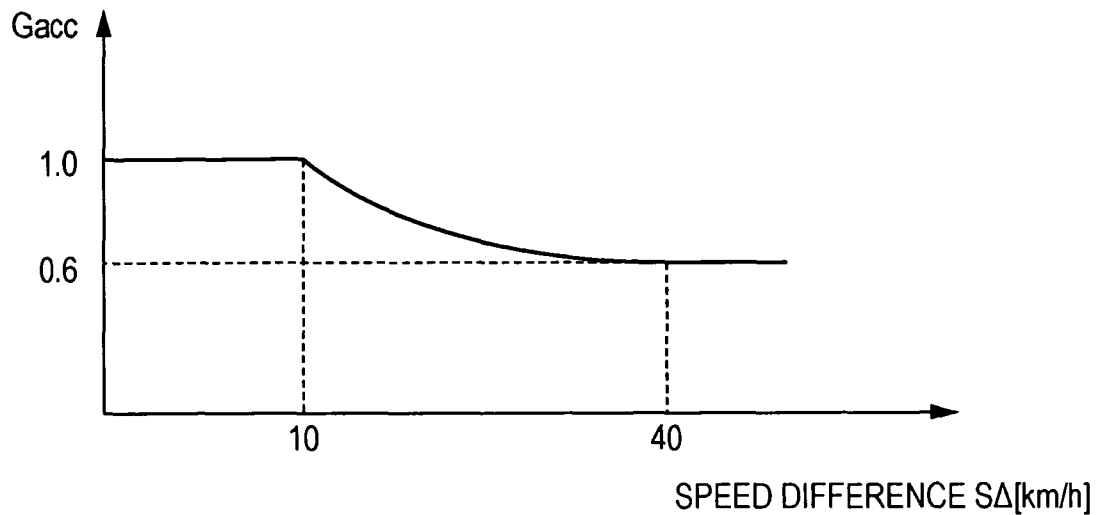
FIG. 7 is an explanatory view showing an accelerator sensitivity table.

As shown in FIG. 7, the accelerator sensitivity table sets the accelerator sensitivity gain Gacc with respect to the speed difference S$\Delta$, which is obtained in advance from an experiment or the like. In this embodiment, for the speed difference S$\Delta$ of 10 [km/h] or less, the accelerator sensitivity gain Gacc is set to 1.0 as an acceptable range. For the speed difference S$\Delta$ of more than 10 [km/h] and less than 40 [km/h], the Gacc is linearly reduced. For the speed difference S$\Delta$ of 40 km/h or more, the accelerator sensitivity gain Gacc is fixed to 0.6. The speed difference S$\Delta$ of 10 [km/h] or less is not considered as an overspeed. Therefore, in the event of a temporary overspeed, accelerator sensitivity is not limited and thus no discomfort is given to the driver.

When the routine proceeds to step S15, it is examined whether or not the accelerator sensitivity gain Gacc is under an overspeed condition. If the accelerator sensitivity gain Gacc is under the overspeed condition (Gacc<1.0), the routine proceeds to step S16. If the accelerator sensitivity gain Gacc is not under the overspeed condition (Gacc=1.0), the routine proceeds to step S18.

Here, a plurality of accelerator sensitivity tables may be prepared for different speeds of the subject vehicle, and one of the tables may be selected according to the vehicle speed of the subject vehicle. For, example, three tables may be prepared for a high speed, a moderate speed and a high speed to delicately tune the accelerator sensitivity gain Gacc.

When the accelerator sensitivity gain Gacc is determined to be under the overspeed condition and the routine proceeds to step S16, it is examined whether or not a timer count value T passes a preset value To (for example, 3 [sec]). If the timer count value T does not pass the preset value To (T<To), the routine proceeds to step S17. If the timer count value T passes the preset value To (T$\geq$To), the routine branches off to step S18.

When the routine proceeds to step S17, the timer count value T is incremented (T$\leftarrow$T+1). The routine proceeds to step S19, wherein the accelerator sensitivity gain Gacc is set to 1.0 (Gacc←1.0). The routine proceeds to step S20, wherein an alarm signal is output. Then the routine is exited.

Accordingly, if the warning device 23 is a warning lamp installed on an instrument panel, the warning lamp lights or blinks to notify the driver of the overspeed. If the warning device 23 is a buzzer, the buzzer is intermittently sounded to notify the driver of the overspeed. Alternatively, if the warning device 23 is a speaker, a voice indicating the overspeed is output from the speaker to alert the driver. On the other hand, when the routine proceeds from step S15 or step S16 to step S18, the timer count value is cleared (T←0), and then the routine is exited.

As described above, in this embodiment, even if the accelerator sensitivity gain Gacc is examined and determined to be under the overspeed condition, an actual accelerator sensitivity gain Gacc is not output immediately, but the accelerator sensitivity gain Gacc is output as 1.0 until the preset time (To) is reached. As a result, when the driver reduces the vehicle speed S to the speed limit (in actuality, speed limit Sr+10 [km/h]), normal throttle opening control is continued as described later, and thus discomfort due to rapid change in accelerator sensitivity is not given to the driver.

Figure 5:
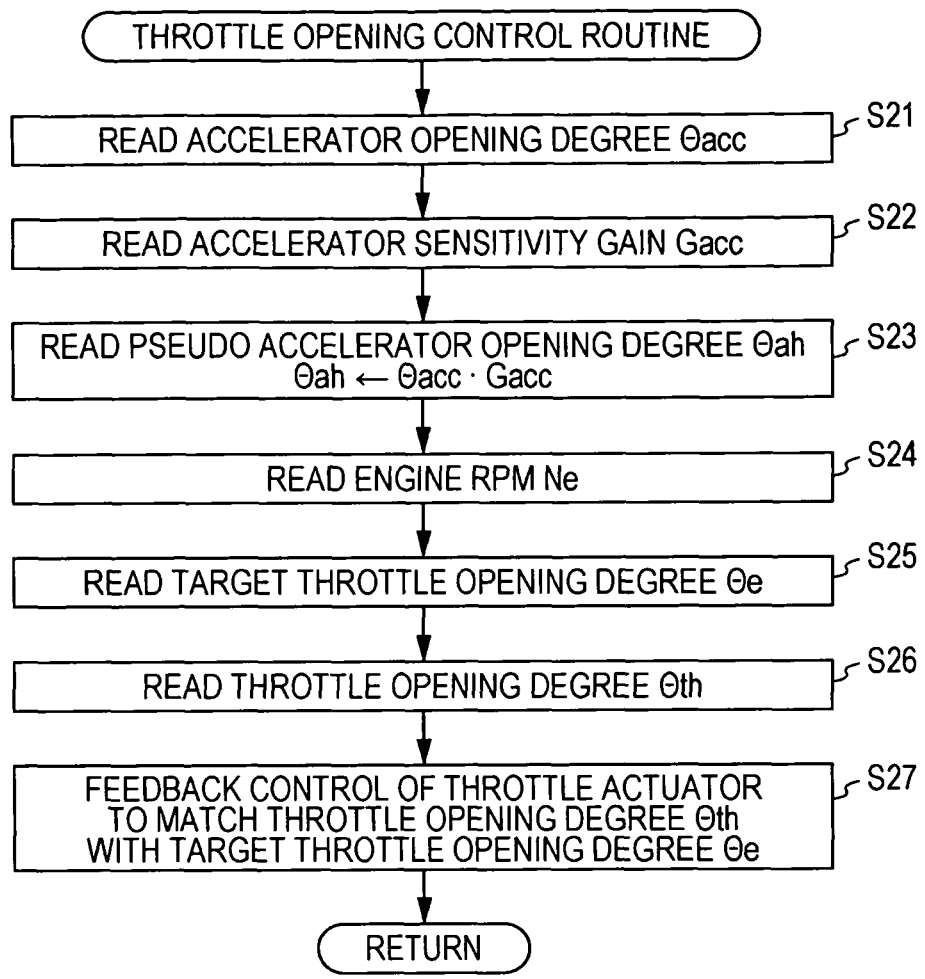
FIG. 5 is a flowchart showing a throttle opening control routine.
Figure 6:
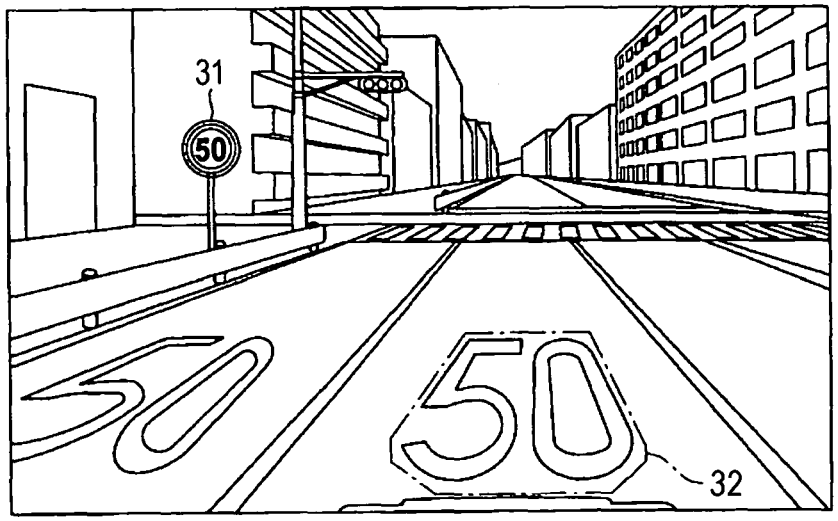
FIG. 6 is an explanatory view showing a speed sign and a speed displayed on a road.

The accelerator sensitivity gain Gacc is read in a throttle opening control routine shown in FIG. 5. In this routine, firstly an accelerator opening degree θacc, which indicates a depressing amount of an accelerator pedal detected by the accelerator opening sensor 4, is read in step S21, and the accelerator sensitivity gain Gacc is read in subsequent step S22.

Then the routine proceeds to step S23, wherein the accelerator opening degree θacc is multiplied with the accelerator sensitivity gain Gacc, in other words, the accelerator opening degree θacc is corrected with the accelerator sensitivity gain Gacc, to obtain an pseudo accelerator opening degree θah (θah←θacc·Gacc). When the accelerator sensitivity gain Gacc is 1.0, the pseudo accelerator opening degree θah is equal to the accelerator opening degree θacc, and no correction is in substance made. It should be noted that the procedure in this step corresponds to the pseudo accelerator opening setter of the present invention.

The routine proceeds to step S24, wherein an engine rpm Ne detected by the engine rpm detector is read. Then in step 25, based on the engine rpm Ne and the pseudo accelerator opening degree θah, a target torque is set referring to the target torque map stored in the ROM 11b to set a target throttle opening degree θe corresponding to the target torque. It should be noted that the procedure in this step corresponds to the target throttle opening setter of the present invention.

Then a throttle opening degree θth, which is detected by the throttle opening sensor 5, is read in step S26, and the throttle actuator 21 is subject to feedback control in step S27 so that the opening degree of the throttle valve 22 (throttle opening degree θth) matches the target throttle opening degree θe. Then the routine is exited.

Figure 8:
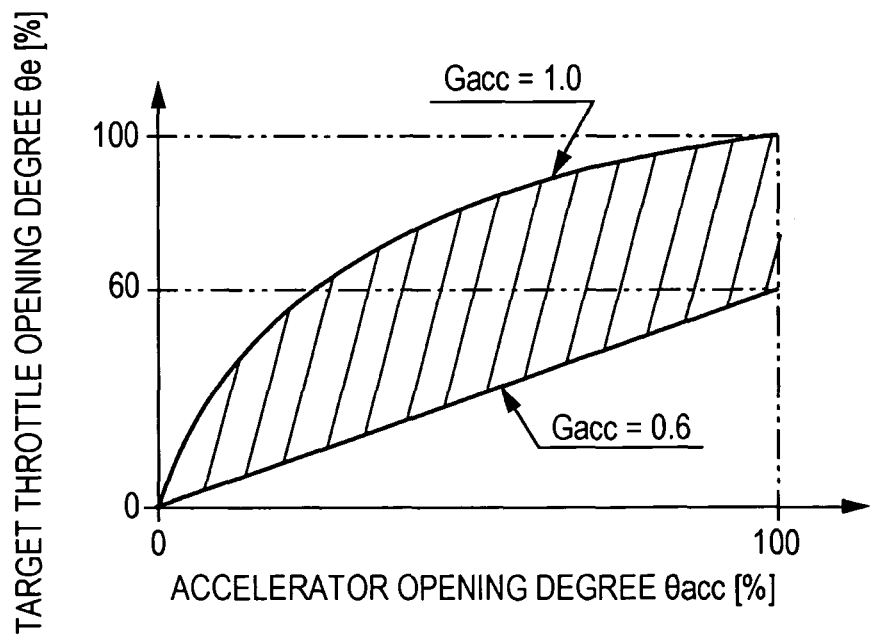
FIG. 8 is an explanatory view showing a target throttle opening table.

As described above, in this embodiment, when the vehicle speed S exceeds the speed limit Sr, as shown in FIG. 7, the accelerator sensitivity gain Gacc is set according to the speed excess (speed difference SΔ), and the target throttle opening degree θe is limited with the accelerator sensitivity gain Gacc. Thus, as shown in FIG. 8, the characteristics of the target throttle opening degree θe with respect to the accelerator opening degree θacc changes according to the accelerator sensitivity gain Gacc. Therefore, the characteristics of the target throttle opening degree θe changes within a hatched region in FIG. 8, based on the value of the accelerator sensitivity gain Gacc. As a result, when the speed excess is, for example, 40 [km/h] or more, the target throttle opening degree θe is opened by 60% at a maximum even if the accelerator pedal is fully pressed, thereby allowing the driver to drive comfortably.

Even if an overspeed occurs, only accelerator sensitivity decreases, and an acceleration and speed increase can be made by pressing the accelerator pedal. Therefore, compared to a conventional speed limiter, which compellingly regulates the vehicle speed, the present invention can significantly reduce discomfort given to the driver.

Further, an overspeed is notified to the driver by an alarm before the throttle opening degree is limited with the accelerator sensitivity gain Gacc. Therefore, if the driver notices the overspeed and immediately reduces the vehicle speed S to the speed limit Sr or less, accelerator sensitivity does not change at all, giving no discomfort to the driver.

Furthermore, a speed limit is recognized by an image captured by the front monitoring camera 1. Therefore, the present invention can be applied to even a vehicle that does not have a car navigation system, and thus high versatility is achieved.

The present invention is not limited to the above-mentioned embodiment. For example, the front monitoring camera 1 may be a stereo camera or a monocular camera.

What is claimed is:

1. A speed limiter comprising:
   a capturer for capturing a front of a subject vehicle;
   a vehicle speed detector for detecting a speed of the subject vehicle;
   an accelerator opening detector for detecting an accelerator opening degree that indicates a depressing amount of an accelerator pedal operated by a driver;
   an engine rpm detector for detecting an engine rpm;
   a speed limit detector for detecting a speed limit displayed on a speed sign, based on an image captured by the capturer;
   an accelerator sensitivity gain setter for setting an accelerator sensitivity gain corresponding to a speed excess if an overspeed is detected based on a speed difference between a vehicle speed detected by the vehicle speed detector and a speed limit detected by the speed limit detector;
   a pseudo accelerator opening setter for setting a pseudo accelerator opening degree by correcting an accelerator opening detected by the accelerator opening detector with an accelerator sensitivity gain set by the accelerator sensitivity gain setter; and
   a target throttle opening setter for setting a target throttle opening degree based on a pseudo accelerator opening degree set by the pseudo accelerator opening setter and an engine rpm detected by the engine rpm detector.

2. The speed limiter according to claim 1, wherein even if an overspeed is detected, the accelerator sensitivity gain setter sets the accelerator sensitivity gain as a value that does not correct the accelerator opening degree within a preset time and outputs a warning signal notifying the overspeed to an alarm.

3. The speed limiter according to claim 1, wherein even if an overspeed is detected, the accelerator sensitivity gain setter sets the accelerator sensitivity gain as a value that does not correct the accelerator opening degree in the case in which the speed difference falls within a predetermined range.

4. The speed limiter according to claim 2, wherein even if an overspeed is detected, the accelerator sensitivity gain setter sets the accelerator sensitivity gain as a value that does not correct the accelerator opening degree in the case in which the speed difference falls within a predetermined range.

5. The speed limiter according to claim 1, wherein the accelerator opening degree is controlled serially as a pseudo accelerator opening degree corresponding to the speed excess which has been pressed by the driver according to the depressing amount of the accelerator pedal operated by the driver.

6. The speed limiter according to claim 1, wherein the throttle opening degree is proportional to a depressing amount of the accelerator pedal operated by the driver.

7. The speed limiter according to claim 1, further comprising a warning device configured to notify the driver if the overspeed is detected.

8. The speed limiter according to claim 1, wherein if an overspeed is detected, only the accelerator sensitivity gain decreases, and a subsequent speed increase is made by an operation of the accelerator pedal by the driver.

9. The speed limiter according to claim 1, wherein the accelerator opening degree is controlled as a pseudo accelerator opening degree corresponding to the speed excess which has been pressed by the driver according to the depressing amount of the accelerator pedal operated by the driver.

10. The speed limiter according to claim 1, wherein a plurality of accelerator sensitivity gain values are stored, each corresponding to a different speed of the subject vehicle, and
wherein the accelerator sensitivity gain setter sets the accelerator sensitivity gain according to the different speed of the subject vehicle corresponding to one of the plurality of sensitivity gain values.

11. The speed limiter according to claim 2, wherein a plurality of accelerator sensitivity gain values are stored, each corresponding to a different speed of the subject vehicle, and
wherein the accelerator sensitivity gain setter sets the accelerator sensitivity gain according to the different speed of the subject vehicle corresponding to one of the plurality of sensitivity gain values.

12. The speed limiter according to claim 1, wherein, if an overspeed is detected, the acceleration sensitivity gain is not set immediately by the accelerator sensitivity gain setter.

13. The speed limiter according to claim 1, wherein, if an overspeed is detected, the accelerator sensitivity gain setter sets the accelerator sensitivity gain as a constant value for a predetermined time.

14. The speed limiter according to claim 1, wherein, if an overspeed is detected, the accelerator sensitivity gain setter sets the accelerator sensitivity gain as a same value as a current value for a predetermined time.

15. The speed limiter according to claim 2, wherein if an overspeed is detected, only the accelerator sensitivity gain decreases, and a subsequent speed increase is made by an operation of the accelerator pedal by the driver.

* * * * *